United States Patent [19]

Andrevski

[11] 4,101,802
[45] Jul. 18, 1978

[54] FLAT DISPLAY DEVICE WITH BEAM GUIDE

[75] Inventor: Zygmunt Marian Andrevski, Princeton, N.J.

[73] Assignee: RCA Corporation, New York, N.Y.

[21] Appl. No.: 775,300

[22] Filed: Mar. 7, 1977

[51] Int. Cl.$^2$ .................. H01J 29/02; H01J 29/82
[52] U.S. Cl. ................................ 313/422; 313/438
[58] Field of Search ..................... 313/422, 417; 315/169 TV

[56] References Cited

U.S. PATENT DOCUMENTS

| 3,714,489 | 1/1973 | Johnson et al. ............... 313/417 |
| 3,842,313 | 10/1974 | Daelen et al. ............... 315/169 TV |
| 3,975,725 | 8/1976 | Ogle ............................. 315/169 TV |
| 4,028,582 | 6/1977 | Anderson et al. ............ 313/422 |

Primary Examiner—Robert Segal
Attorney, Agent, or Firm—Eugene M. Whitacre; Donald S. Cohen; George S. Haas

[57] ABSTRACT

An evacuated envelope having substantially flat, spaced apart front and back walls and support walls extending between the front and back walls forming a plurality of parallel channels extending along the front and back walls. In each of the channels is an electron beam guide assembly which includes a pair of spaced, parallel plates fixedly secured together along parallel elongated edges by spacer members which are between the plates and to which the plates are mechanically secured. The plates have a plurality of openings therethrough arranged in rows longitudinally along and transversely across the plates with the openings in one plate being aligned with the openings in the other plate. The beam guide assembly fits in tracks formed along the support wall adjacent the back wall so as to support the beam guide assembly in fixed, spaced relation to the back wall. A plurality of spaced, parallel conductors are on the back wall and extend transversely across the channels, and a gun structure is provided at the one end of the channels for generating beams of electrons and directing the beams into the beam guide assemblies between the plates.

11 Claims, 5 Drawing Figures

FLAT DISPLAY DEVICE WITH BEAM GUIDE

BACKGROUND OF THE INVENTION

The present invention relates to a flat display device having beam guides, and particularly to a beam guide assembly which can be easily assembled and mounted in the display device envelope.

There has been developed a flat display device which includes an evacuated envelope having substantially flat, spaced front and back walls and spaced, parallel support walls extending between the front and back walls. The support walls form a plurality of parallel channels extending across the front and back walls. A gun structure extends across one end of the channels and is adapted to generate electrons and direct the electrons as beams into the channels. In each of the channels is at least one beam guide which confines the electrons in the beam as the beam flows along the channels but which permits the beam to be deflected toward a phosphor screen on the surface of the front wall at a plurality of points along the channel. Such a display device is described in the copending application for U.S. Patent of C. H. Anderson et al, Ser. No. 615,353, filed Sept. 22, 1975, entitled "Guided Beam Flat Display Device", now U.S. Pat. No. 4,028,582 of June 7, 1977.

One type of beam guide which has been developed for use in a display device includes a pair of spaced, parallel plates extending transversely across and longitudinally along the channels in closely spaced relation to the back wall. The plates have a plurality of openings therethrough which are arranged in rows both longitudinally along and transversely across the plates. The openings in one of the plates are in alignment with the openings in the other plate. Each longitudinal row of openings is a separate beam guide. On the inner surface of the back wall are a plurality of spaced, parallel conductors which extend transversely across the channels. Each of the conductors extends along a separate transverse row of the openings in the plates. This beam guide and its operation is described in the copending application for U.S. Patent of W. W. Siekanowicz et al, Ser. No. 671,358, filed Mar. 29, 1976, entitled "Flat Display Device With Beam Guide".

For the commercial production of the above described type of display device it is desirable to be able to quickly and easily assemble the various elements of the device with high precision. Therefore, it would be desirable to have a beam guide assembly of the type described above which can be easily and quickly assembled and mounted in the envelope with high precision and uniformity of the spacing between the plates, of the spacing between the plates and the conductors on the back wall and of the alignment of the plates from one channel to the next.

SUMMARY OF THE INVENTION

In a display device of the type described having an electron beam guide assembly in each of the channels. Each of the electron beam guide assemblies includes a pair of spaced, parallel plates each having a pair of spaced, elongated, substantially parallel edges, and a separate spacer member between the plates along each of said edges. Each of the plates is secured to the spacer members so that the plates are in fixed relation to each other. Each of the guide assemblies extends across a separate channel adjacent the back wall and is supported in a fixed spaced relation to the back wall.

DETAILED DESCRIPTION OF THE INVENTION

Figure 1:
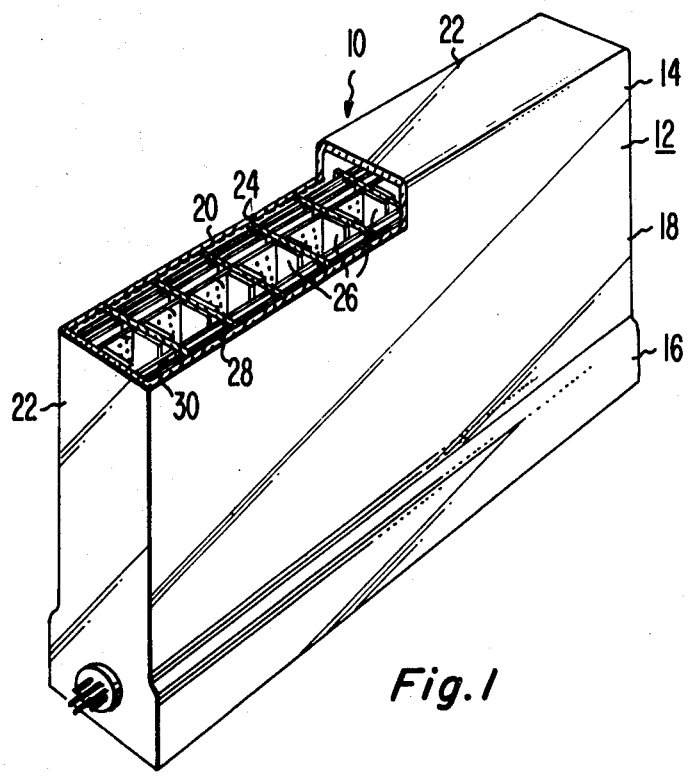
FIG. 1 is a perspective view, partially broken away, of a form of the display device of the present invention.

Referring to FIG. 1, one form of a flat display device of the present invention is generally designated as 10. The display device 10 comprises an evacuated envelope 12, typically of glass, having a display section 14 and an electron gun section 16. The display section 14 includes a rectangular front wall 18 which supports the viewing screen, and a rectangular back wall 20 in spaced, parallel relation with the front wall 18. The front wall 18 and back wall 20 are connected by side walls 22. The front wall 18 and back wall 20 are dimensioned to provide the size of the viewing screen desired, e.g. 75 × 100 cm., and are spaced apart about 2.5 to 7.5 cm.

A plurality of spaced, parallel support walls 24 are secured between the front wall 18 and the back wall 20 and extend from the gun section 16 to the opposite side wall 22. The support walls 24 provide the desired internal support for the evacuated envelope 12 against external atmospheric pressure and divide the display section 14 into a plurality of channels 26. On the inner surface of the front wall 18 is a phosphor screen 28. The phosphor screen 28 may be of any well known type presently being used in cathode ray tubes, e.g. black and white or color television display tubes. A metal film electrode 30 is provided on the phosphor screen 28.

The gun section 16 is an extension of the display section 14 and extends along one set of adjacent ends of the channels 26. The gun section may be of any shape suitable to enclose the particular gun structure contained therein. The electron gun structure contained in gun section 16 may be of any well known construction suitable for selectively directing beams of electrons along each of the channels 26. For example, the gun structure may comprise a plurality of individual guns mounted at the ends of the channels 26 for directing separate beams of electrons along the channels. Alternatively, the gun structure may include a line cathode extending along the gun section 16 across the ends of the channels 26 and adapted to selectively direct individual beams of electrons along the channels. A gun structure of the line type is described in U.S. Pat. No. 2,858,464 to W. L. Roberts, issued Oct. 28, 1958, entitled "Cathode Ray Tube".

In each of the channels 26 is a focusing guide assembly 32 which includes focusing guides for confining electrons directed into the channel into beams which travel a path along the channel. Also in the channels 26 is means for deflecting the beams out of the guides toward the phosphor screen 28 at various points along the length of the channel 26.

Figure 2:
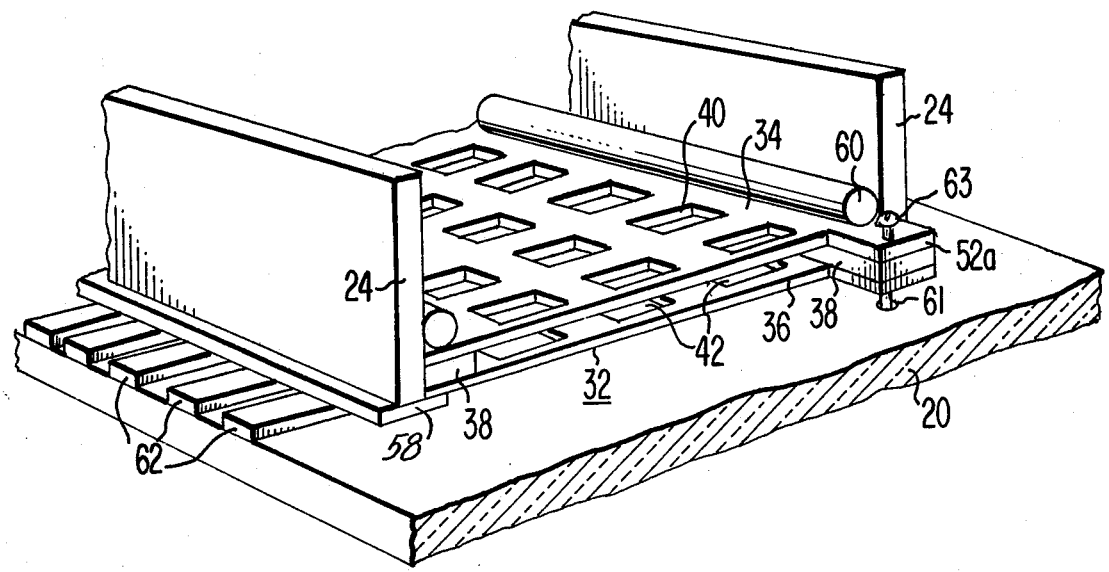
FIG. 2 is a perspective view of a portion of one channel of the display device showing the beam guide assembly of the present invention.

Referring to FIG. 2, the beam guide assembly 32 includes a pair of substantially rectangular grid plates 34 and 36 secured together in spaced parallel relation by a pair of metal spacer members 38. The spacer members 38 are between the grid plates 34 and 36 and extend along the elongated, parallel edges of the grid plates. The grid plate 34 has a plurality of openings 40 therethrough which are arranged in rows longitudinally along and transversely across the channel 26. The grid plate 36 also has a plurality of openings 42 therethrough which are arranged in rows longitudinally along and transversely across the channel 26 with each of the openings 42 being aligned with a separate opening 40 in the grid plate 34. As described in copending application Ser. No. 671,358 each pair of longitudinal rows of the openings 40 and 42 forms a beam focusing guide.

Figure 3:
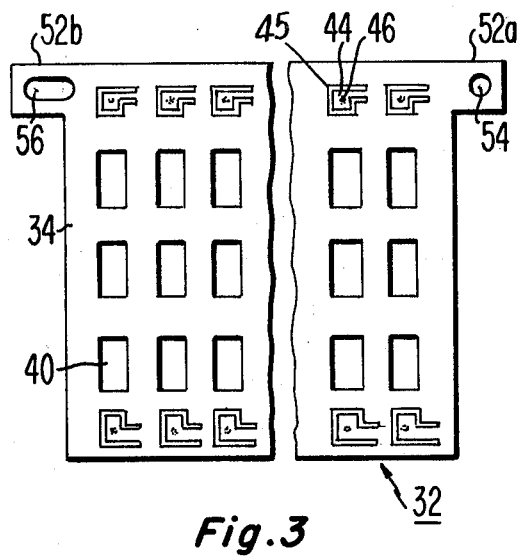
FIG. 3 is a top plan view of one form of the beam guide assembly of the present invention.
Figure 4:
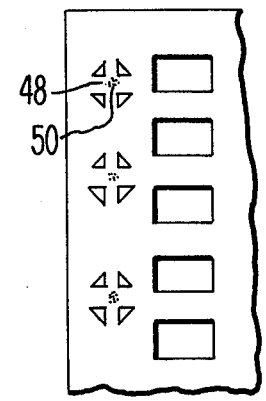
FIG. 4 is a top plan view of a portion of another form of the beam guide assembly.

The grid plates 34 and 36 are secured to the spacer members 38 so that the grid plates are fixedly held in spaced, parallel relation to each other, and so that the grid plates are electrically connected to each other through the spacer members. For ease of manufacture of the beam guide assembly 32, the grid plates 34 and 36 are preferably spot welded to the spacer members 38 along the elongated longitudinal edges of the grid plates. Since spot welding generates heat which could cause warping of the grid plates, to prevent such warping the grid plates can be provided with spaced flexible tabs 44 along their elongated longitudinal edges. As shown in FIG. 3 the tabs 44 are formed by slits 45 in the grid plate which surround the tabs except where the tabs are left attached to the grid plate. The slits 45 isolate the tabs 44 from the grid plate so that when the spot welds 46 are made within the tabs 44 the heat flow to the grid plates is minimized. An alternative technique for preventing warping of the grid plates is shown in FIG. 4 wherein the grid plate is cut out to provide a plurality of spaced, flexible crosses 48. The weld 50 is then made at the center of the cross 48.

As shown in FIG. 3, the beam guide assembly 32 has a pair of mounting arms 52a and 52b extending longitudinally from the opposite ends of the beam guide assembly in alignment with one of the elongated longitudinal edges of the grid plates. The mounting arms 52a and 52b are extensions of the grid plates 34 and 36 and the spacer member 38 which extends along the longitudinal edge. The mounting tab 52a has a round hole 54 therethrough and the mounting tab 52b has an elongated hole 56 therethrough.

As shown in FIG. 2, a spacer 58 of an insulating material, such as glass, is provided between each of the support walls 24 and the back wall 20. Each of the spacers 58 projects into each of the channels 26 on opposite sides of the support wall 24 so as to provide a ledge along each surface of each of the support walls. The spacers 58 are of substantially uniform thickness which is equal to the desired spacing between the beam guide assembly 32 and the back wall 20. Each spacer 58 may be an elongated strip of the insulating material extending the full length of the support wall or a plurality of short strips spaced along the support wall. A separate elongated rod 60 of an electrical insulating material, such as glass, is secured to each surface of each support wall 24 in closely spaced, parallel relation to the strip 58. The rod 60 is spaced from the strip 58 a distance equal to the thickness of the guide assembly 32. Each of the rods 60 forms with its adjacent strip 58 a track in which an elongated longitudinal side edge of a guide assembly 32 fits to support the guide assembly 32 in the channel 26 in the desired spaced relation to the back wall 20.

On the inner surface of the back wall 20 are a plurality of spaced, parallel conductors 62. The conductors 62 are strips of an electrically conductive material, such as a metal, coated on the inner surface of the back wall 20. The conductors 62 extend transversely across the channels 26 with each of the conductors 62 being positioned along a separate transverse row of the openings 40 and 42 in the grid plates 34 and 36.

In the assembly of the display device 10, the beam guide assemblies 32 are each inserted into one end of a channel 26 with the elongated longitudinal edges of the beam guide assembly fitting into the tracks formed between the rods 60 and the spacers 58. This places the beam guide assemblies 32 at the proper distance from the conductors 62 on the back wall 20. At each end of each of the channels 26 are locating holes 61 in the back wall 20. A separate locating pin 63 fits through each of the holes 54 and 56 in the mounting arms 52a and 52b of the beam guide assembly 32 and fit tightly into a hole 61. The locating holes at one end of the channels are positioned in alignment so that they automatically align all of the beam guide assemblies 32 with the transverse rows of the grid plate openings 40 and 42 being in alignment. The alignment of the transverse rows of the grid plate openings is necessary to achieve proper horizontal line scan of the phosphor screen. The locating holes 61 at the other ends of the channels are aligned with the first locating holes so that when the locating pins 63 are in the holes 54 and 56 all of the longitudinal rows of the grid plate openings 40 and 42 will be parallel to each other. Thus, the beam guide assemblies 32 can be easily and quickly mounted in the display device 10 by sliding the beam guide assemblies into the channels 26 in the tracks between the rods 60 and the spacers 58 and inserting the locating pins 63 in the locating holes 61. However, there is provided good accuracy of the spacing between the grid plates 34 and 36 as a result of their being part of the beam guide assembly 32, good accuracy of the spacing between the beam guide assembly 32 and the conductors 62 by using the spacers 58, and good alignment of the beam guide assemblies 32 from channel to channel by using the locating holes and pins. Although the beam guide assembly 32 is shown as having a round hole 54 in the mounting arm 52a, the hole can be of any shape which will snugly receive a locating pin 63.

The display device 10 operates in the manner described in the copending application, Ser. No. 671,358. A high positive potential, typically about +300V, is applied to each of the conductors 62, and a low positive potential, typically about +40V, is applied to the beam guide assembly 32. Beams of electrons are directed into the channels 26 between the grid plates 34 and 36 of the beam guide assembly 32 with each beam being directed along a longitudinal row of the grid plate openings 40 and 42. The potential difference between the beam guide assembly 32 and the conductors 62, and the potential difference between the beam guide assembly 32 and the metal film 30 on the front wall 18, which is at a high positive potential (+2000V. to +8000V.) creates an electric force field within the space between the grid plates 34 and 36 as described in application Ser. No. 671,358. This force field applies force to the electrons to confine the electrons to the beam in directions perpendicular to the planes of the grid plates and transversely of the channel. The beams can be selectively deflected out of the beam guide assembly 32 toward the phosphor screen 28 at each of the transverse rows of the grid plate openings to achieve a line-by-line scan of the phosphor screen by selectively switching the potential applied to each of the conductors 62 to a negative potential, such as −100V.

Figure 5:
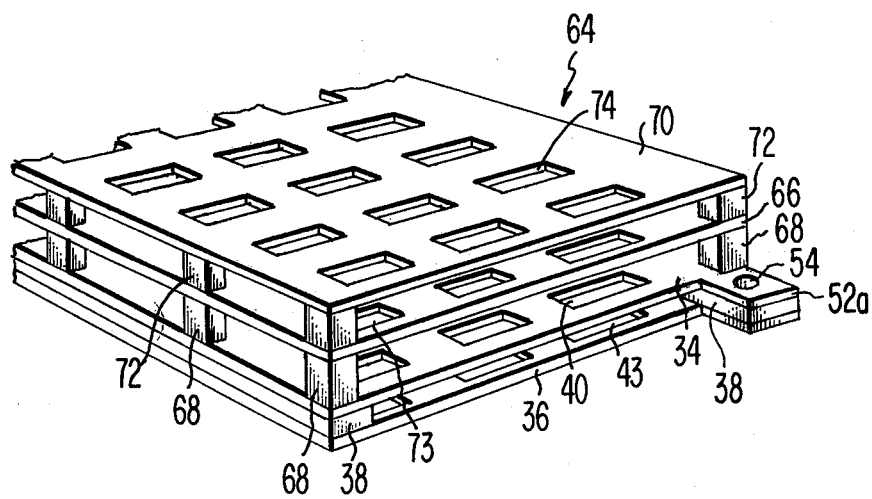
FIG. 5 is a perspective view of a portion of a beam guide assembly which also includes focusing and acceleration grids.

As described in the previously referred to application of C. H. Anderson et al, Ser. No. 615,353, the display device may include in each channel between the focusing guide and the phosphor screen spaced, parallel focusing and acceleration grids. In order to permit ease of assembling such a display device it would be desirable to have the focusing grid and the acceleration grid as a part of the focusing guide assembly. Referring to FIG. 5, there is shown an assembly 64 which includes a focusing guide assembly 32 having grid plates 34 and 36 secured together in spaced parallel relation by the spacers 38. A focusing grid 66 is in spaced, parallel relation to the grid plate 34 of the focusing guide assembly 32. The focusing grid 66 is secured to the grid plate 34 by a plurality of spacer posts 68 which are along the elongated side edges of the grids. The spacer posts 68 are of an electrical insulating material, such as glass or a ceramic. An acceleration grid 70 is in spaced parallel relation to the focusing grid 66 and is secured thereto by a plurality of spacer posts 72. The spacer posts 72 are of an electrical insulating material, such as a glass or a ceramic. The focusing grid 66 and acceleration grid 70 have openings 73 and 74 respectively therethrough which are aligned with the openings 40 and 42 in the grid plates 34 and 36 of the focusing guide assembly 32. Thus, the focusing grid 66, acceleration grid 70 and focusing guide assembly 32 are secured together in a single assembly 64 with the focusing grid 66 and acceleration grid 70 electrically insulating from each other and from the focusing guide assembly 32.

The assembly 64 may be mounted in each of the channels 26 of the display device 10 in the same manner as previously described for mounting the focusing guide assemblies 32. Each assembly 64 may be slid into its respective channel 26 from one end of the channel between the spacers 58 and the rods 60. The rods 60 would be spaced from the spacers 58 a distance corresponding to the thickness of the assembly 64. The focusing guide assembly 32 of the assembly 64 may be provided with mounting arms as shown in FIG. 3 to permit proper alignment of the assembly 64 in the channel.

I claim:

1. In a display device which includes an evacuated envelope having spaced, substantially parallel front and back walls, spaced parallel support walls between the front and back walls forming a plurality of channels extending across the front and back wall and an electron beam guide assembly in each of said channels, the improvement comprising:

each of said electron beam guide assemblies including a pair of spaced, parallel grid plates each having a pair of spaced elongated substantially parallel edges, a separate spacer member between said grid plates at each of said edges, each of said grid plates being secured to said spacer members so that the plates are in a fixed relation to each other, each of said guide assemblies extending across a separate channel adjacent to the back wall, and means along the support walls for supporting said guide assemblies in a fixed spaced relation to said back wall.

2. A display device in accordance with claim 1 in which each of the grid plates has a plurality of openings therethrough, said openings being arranged in rows both longitudinally along and transversely across the channels and the openings in one of said grid plates being aligned with the openings in the other grid plate.

3. A display device in accordance with claim 2 including a plurality of spaced, parallel conductors on the inner surface of the back wall, said conductors extending transversely across the channels with each conductor extending along a separate transverse row of the openings in the grid plates.

4. A display device in accordance with claim 2 including a spacer of an electrical insulating material between each of the support walls and the back wall, each of said spacers extending into the channels on each side of the support wall and forming a ledge on which the guide assembly is seated to space the guide assembly from the back wall.

5. A display device in accordance with claim 2 in which each of said electron beam guide assemblies includes a separate mounting arm extending longitudinally from each end thereof at one end of said elongated edges with each of said mounting arms having a hole therethrough aligned with a separate hole in the envelope.

6. A display device in accordance with claim 5 in which one of said mounting tabs has a hole therethrough which is shaped to snugly receive a locating pin and the other mounting arm has an elongated hole therethrough.

7. A display device in accordance with claim 6 in which each of the mounting tabs are extensions of the grid plates and the spacer member at said one elongated edge.

8. A display device in accordance with claim 7 in which each of the grid plates of each of the electron beam guide assemblies has a plurality of flexible elements spaced along each of its elongated edges and the grid plates are secured to the spacer members by welds at each of the flexible elements.

9. A display device in accordance with claim 2 in which each of the assemblies has attached thereto a focusing grid in spaced parallel relation to one of the grid plates, an acceleration grid in spaced parallel relation to said focusing grid, each of said focusing grid and acceleration grid having openings therethrough aligned with the openings in said grid plates, and spacer means securing the focusing grid to one of said grid plates and spacer means securing the acceleration grid to said focusing grid.

10. A display evice in accordance with claim 9 in which the spacer means are spacer posts of an electrical insulating material arranged in spaced relation along the elongated edges of the assembly.

11. A display device as in claim 1, wherein the means for supporting said guide assemblies comprise a member secured to the surface of each support wall and in contact with the electron beam guide assembly.

* * * * *

UNITED STATES PATENT AND TRADEMARK OFFICE
CERTIFICATE OF CORRECTION

PATENT NO. : 4,101,802
DATED : July 18, 1978
INVENTOR(S) : Zygmunt Marian Andrevski It is certified that error appears in the above-identified patent and that said Letters Patent is hereby corrected as shown below:

Column 6, line 16:       "claim 2" should be --claim 11--.

Signed and Sealed this

Twentieth Day of February 1979

[SEAL]

Attest:

RUTH C. MASON
*Attesting Officer*

DONALD W. BANNER
*Commissioner of Patents and Trademarks*